United States Patent
Wang

(10) Patent No.: US 11,414,091 B2
(45) Date of Patent: Aug. 16, 2022

(54) SAFETY CONTROL SYSTEM AND METHOD FOR USE IN VEHICLES

(71) Applicant: CONTINENTAL AUTOMOTIVE GMBH, Hannover (DE)

(72) Inventor: Yiqun Wang, Changchun (CN)

(73) Assignee: Continental Automotive GmbH, Hannover (DE)

(*) Notice: Subject to any disclaimer, the term of this patent is extended or adjusted under 35 U.S.C. 154(b) by 99 days.

(21) Appl. No.: 16/601,017

(22) Filed: Oct. 14, 2019

(65) Prior Publication Data

US 2020/0039529 A1 Feb. 6, 2020

Related U.S. Application Data

(63) Continuation of application No. PCT/EP2018/055704, filed on Mar. 8, 2018.

(51) Int. Cl.
*B60W 50/02* (2012.01)
*B60R 21/0136* (2006.01)
(Continued)

(52) U.S. Cl.
CPC ..... *B60W 50/0205* (2013.01); *B60R 21/0136* (2013.01); *B60R 21/34* (2013.01); *B60W 50/038* (2013.01); *G01S 13/931* (2013.01); *G07C 5/0808* (2013.01); *B60R 2021/01184* (2013.01); *B60R 2021/01286* (2013.01); *B60W 2420/52* (2013.01); *B60W 2554/801* (2020.02); *B60W 2720/10* (2013.01); *B60W 2754/30* (2020.02); *G01S 2013/9322* (2020.01)

(58) Field of Classification Search
CPC ............ B60W 50/0205; G07C 5/0808; B60R 2021/01184; B60R 21/01; B60R 16/0232
See application file for complete search history.

(56) References Cited

U.S. PATENT DOCUMENTS 10,083,588 B1 * 9/2018 Kapoor ................ B60W 50/14

FOREIGN PATENT DOCUMENTS

| CN | 2041647 U | 7/1989 |
| CN | 202413433 U | 9/2012 |

(Continued)

OTHER PUBLICATIONS

Chinese Second Office Action dated Mar. 5, 2020 for the counterpart Chinese Patent Application No. 201710244017.5.

(Continued)

*Primary Examiner* — Michael J Zanelli

(57) ABSTRACT

A vehicle safety control system includes: a passive safety device, configured to afford passive safety protection to the vehicle; a fault detection device, configured to detect whether any fault has occurred in the passive safety device and which upon detection of a fault in the passive safety device instructs that fault information informing of such fault in the passive safety device be transmitted to a control device. The vehicle safety system also includes a control device, configured to respond to the fault information that is received, determine a corresponding active safety protection solution and issue a control instruction of such active safety protection solution to an active safety device; and an active safety protection device, configured to respond to control instructions and execute the active safety protection solution.

10 Claims, 3 Drawing Sheets

(51) Int. Cl.
    *B60R 21/34*     (2011.01)
    *B60W 50/038*     (2012.01)
    *G01S 13/931*     (2020.01)
    *G07C 5/08*     (2006.01)
    *B60R 21/01*     (2006.01)

(56) References Cited

FOREIGN PATENT DOCUMENTS

| | | |
|---|---|---|
| CN | 203126766 U | 8/2013 |
| CN | 203372187 U | 1/2014 |
| CN | 204323282 U | 5/2015 |
| CN | 106274748 A | 1/2017 |
| CN | 106274795 A | 1/2017 |
| DE | 102006013381 A1 | 9/2007 |
| DE | 102014116723 A1 | 5/2016 |
| DE | 102015219402 A1 | 3/2017 |

OTHER PUBLICATIONS

International Search Report and Written Opinion dated 8 June from corresponding International Patent Application No. PCT/EP2018/055704.
Chinese Office Action dated Aug. 23, 2019 for corresponding Chinese Patent Application No. 201710244017.5.

\* cited by examiner

SAFETY CONTROL SYSTEM AND METHOD FOR USE IN VEHICLES

CROSS-REFERENCE TO RELATED APPLICATIONS

This application claims the benefit of PCT Application PCT/EP2018/055704, filed Mar. 8, 2018, which claims priority to Chinese Application 201710244017.5, filed Apr. 14, 2017. The disclosures of the above applications are incorporated herein by reference.

TECHNICAL FIELD

The disclosure relates to the field of automotive technology, and specifically to a safety control system and corresponding method thereof for use in vehicles.

BACKGROUND

Given high levels of car ownership around the world, road casualties are responsible for a substantial share of the number of accidental injuries each year. Following a fault in a vehicle, protection is usually afforded to the occupants by its passive safety system. Such passive safety systems may include airbags and safety belts. However, in case of an accident, the occupants of a vehicle could well be subject to significantly more severe injuries should the passive safety system be rendered ineffective or restricted.

SUMMARY

The disclosure provides a safety control system and corresponding method thereof for use in vehicles, which provides active safety protection in case of a fault in the passive safety system of the vehicle, thereby increasing its safety by reducing the risk of traffic accidents and injury to the vehicle occupants.

One aspect of the disclosure provides a vehicle safety control system. The system may include: a passive safety device that provides passive safety protection to the vehicle; a fault detection device that detects whether any fault has occurred in the passive safety device and which upon detection of a fault in the passive safety device instructs that fault information informing of such fault in the passive safety device be transmitted to a control device.

The control device responds to the fault information that is received, determines a corresponding active safety protection solution and issues a control instruction of such active safety protection solution to an active safety device. An active safety protection device responds to control instructions and execute the active safety protection solution.

Implementations of the disclosure may include one or more of the following optional features. In some implementations, the passive safety device includes at least one of the following devices: an airbag device, a safety belt device, a side impact sensor or a pedestrian protection device. The active safety device includes at least one of the following devices: a radar device, a speed-limiting device or a safe distance control device.

In some examples, the control device is further configured to respond to fault information received from the detection device, and to determine that the active safety protection solution is to lower the maximum speed of the vehicle by way of the speed-limiting device. For example, the fault information is about a fault in the safety belt device.

In some implementations, the control device is further configured to respond to the fault information received from the detection device, and to determine that the active safety protection solution is to increase the safe distance of the vehicle by way of the safe distance control device.

In some implementations, the control device is further configured to respond to the fault information received from the detection device, and to determine that the active safety protection solution is to lower the maximum speed of the vehicle by way of the speed limiting device.

In some examples, the control device is further configured to respond to the fault information received from the detection device, and to determine that the active safety protection solution is to lower the maximum speed and increase the safe distance of the vehicle by way of the speed limiting device and safe distance control device, respectively. For example, the fault information is about a fault in the safety belt device.

In some implementations, the control device is further configured to respond to the fault information received from the detection device, and to determine that the active safety protection solution is to increase the detection range of the radar device. In some examples, the control device is further configured to respond to the fault information informing of a fault in the passive protection device received from the detection device, and to suspend the operation of the passive protection device.

The safety control system may further include a notification device, configured to provide notification of a fault in the passive safety device.

In some examples, the notification device includes at least one of the following devices: a display and a loudspeaker.

Another aspect of the disclosure provides a safety control method for use in vehicles. The method may include: detecting a fault in a passive safety device; determining a corresponding active safety protection solution upon detection of a fault in the passive safety device; and executing the active safety protection solution by way of active safety devices upon instruction.

By adopting the vehicle safety control system, the risk of accidents may be reduced, thereby improving the safety of the vehicle and safeguarding its occupants.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
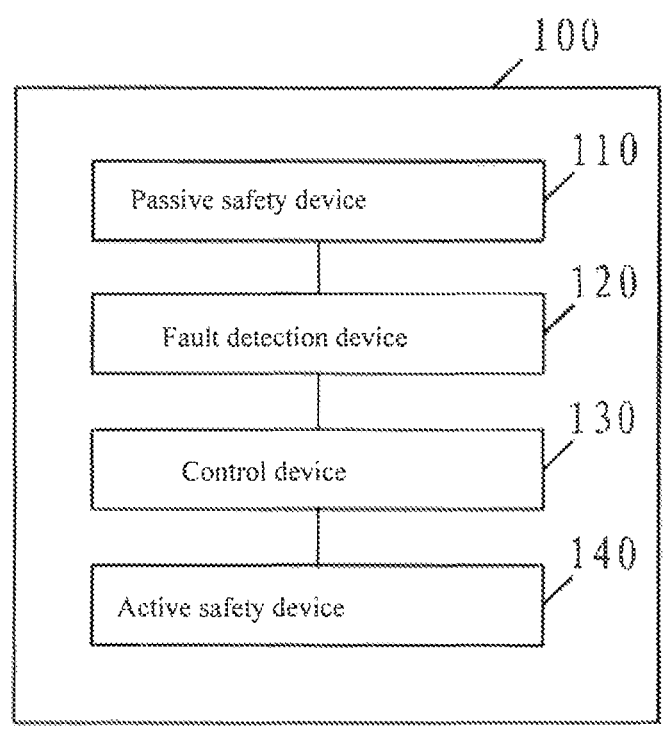
FIG. 1 is an exemplary safety control system for use in vehicles.

FIG. 1 shows a vehicle safety control system 100. As shown in FIG. 1, the safety control system 100 includes a passive safety device 110, a fault detection device 120, a control device 130 and an active safety device 140. In some implementations, the passive safety device 110 provides passive safety protection to a vehicle. The fault detection device 120 may detect whether any fault has occurred in the passive safety device 110, and which upon detection of a fault in the passive safety device 110 instructs that fault information informing of such fault in the passive safety device 110 be transmitted to the control device 130, which can then respond to the fault information that is received, determine a corresponding active safety protection solution and issue a control instruction of such active safety protection solution to the active safety device 140. The active safety device 140 may respond to the control instruction and execute the active safety protection solution. The passive safety device 110, fault detection device 120, control device 130 and active safety device 140 are linked together via connections to a communication network. Examples of a communication network may include any Controller Area Network bus (CAN bus), Ethernet, and other Local Interconnect Network installed on the vehicle.

Figure 2:
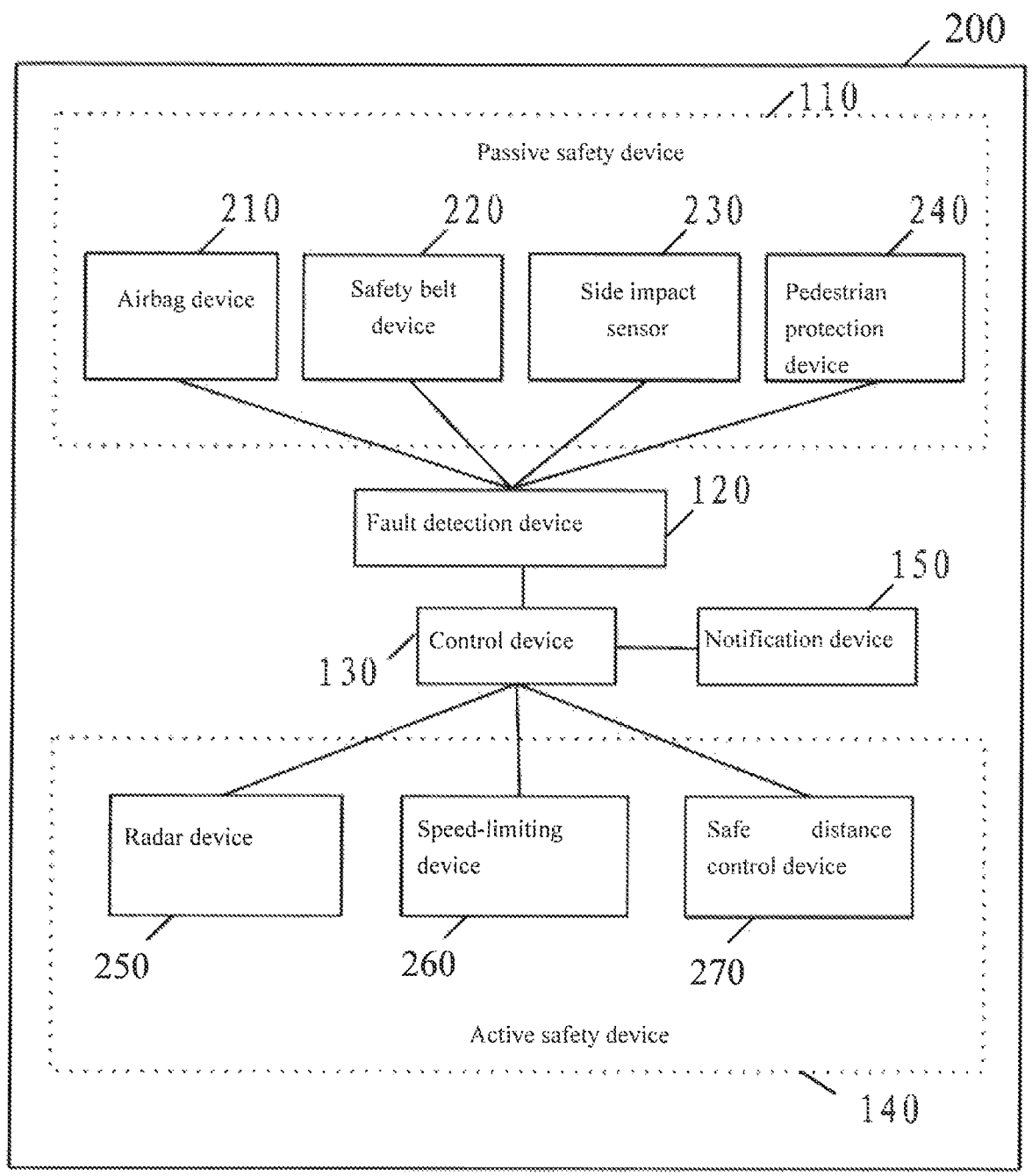
FIG. 2 is another exemplary safety control system for use in vehicles.

FIG. 2 shows a vehicle safety control system 200. As shown in FIG. 2, a passive safety device 110 may include components such as an airbag device 210, a safety belt device 220, a side impact sensor 230 and a pedestrian protection device 240, etc. The passive safety device 110 may generally provide protection to the vehicle and safeguard its occupants following the vehicle being involved in an accident.

For example, as a vehicle colliding with an obstacle will easily result in a forceful impact between the interior of the vehicle and its occupants, the airbag device 210 may be inflated immediately after the collision to form a gas-filled cushion, which reduces the shock experienced by the occupants and absorbs energy from the collision, thereby lessening the injuries caused to the occupants. The safety belt device 220 provides a restraint for the vehicle occupants and prevents secondary collision between the occupants and devices such as the steering wheel and dashboard, or prevents the occupants from being ejected from the vehicle in case of collision. When a lateral collision occurs in the area of the car doors, the side impact sensor 230 is able to detect the intensity of the impact in a more timely and accurate manner, thereby further reducing the period of time between the occurrence of a collision and the activation of the airbag device 210 and safety belt device 220. The pedestrian protection device 240 may elevate or lower the bonnet of the vehicle upon its collision with a pedestrian so that the person does not collide with the stiff panel of the vehicle but a relatively soft and rounded buffer surface instead.

The fault detection device 120 may detect faults in any of these safety devices, for example, the airbag device 210, safety belt device 220, side impact sensor 230 and pedestrian protection device 240, and, upon detection of a fault in any one of such devices, instructs that fault information informing of such fault in the device be transmitted to a control device 130.

It will be understood by a person skilled in the art that the fault detection device 120 may also be installed on the vehicle as an independent component and coupled with a passive safety device, and may also be integrated with each of the passive safety devices 110. For example, the pedestrian protection device 240 is generally capable of automatic fault detection, that is, the pedestrian protection device 240 includes a fault detection device 120, which, upon detection of any fault within the pedestrian protection device 240 itself, will instruct that fault information informing of such fault in the pedestrian protection device 240 be transmitted to the control device 130.

The active safety device 140 may include components such as a radar device 250, a speed-limiting device 260 and a safe distance control device 270, etc. The active safety device 140 may generally afford protection to the vehicle prior to any impending danger to prevent any accident from happening. For example, the radar device 250 may detect any object and pedestrian within a designated area surrounding the vehicle. The speed-limiting device 260 can limit the maximum speed of the vehicle. The safe distance control device 270 may calculate a safe distance between the vehicle and any object in its vicinity.

As shown in FIG. 2, the safety control device 200 may further include a notification device 150, which is coupled with the control device 130. Upon receiving, from the fault detection device 120, a fault information informing of a fault in the passive safety device 110, the control device 130 further forwards such fault information to the notification device 150. The notification device 150 notifies the occupants of the vehicle of such a fault in the passive safety device as detailed in the fault information that is received. In some examples, the notification device 150 may be a display and/or loudspeaker.

In some implementations, the fault detection device 120, upon detection of any fault in the airbag device 210, instructs that fault information informing of such a fault in the airbag device 210 to be transmitted to the control device 130, which may then respond to the fault information that is received, determining the active safety protection solution to be a reduction in the maximum speed of the vehicle, and issue a control instruction to the speed-limiting device 260 of the vehicle requesting such a reduction in the vehicle's maximum speed. For example, the airbag device 210 will generally only operate when the speed of the vehicle is above a certain designated speed so that the control device 130, upon receiving a fault information of the airbag device 210, may issue a control instruction to the speed-limiting device 260 requesting a reduction in the maximum speed of the vehicle to the designated speed. The speed-limiting device 260 limits the maximum speed of the vehicle according to the control instruction. In this way, by imposing restrictions on the vehicle while it moves at high speed, the potential risk of serious damage may be averted. Furthermore, the control device 130 also sends to the notification device 150 a fault information informing of a fault in the airbag device 210 while the notification device 150 is responsible for notifying the occupants of the fault in the airbag device 210, which requires examination and maintenance.

In some implementations, the fault detection device 120, upon detection of any fault, for example, in the safety belt, instructs that fault information to be transmitted to the control device 130, which can then respond to the fault information that is received, determining the active safety protection solutions to be a reduction in the maximum speed and an increase in the safe distance of the vehicle, and issue a control instruction to its speed-limiting device 260 requesting such a reduction in the maximum speed of the vehicle and another control instruction to the safe distance control device 270 requesting such an increase in the safe distance of the vehicle. In some examples, the safe distance of the vehicle refers to any safe distance that prevents the vehicle from experiencing an accident, which may include, for example, a safe braking distance, safe following distance kept between the vehicle and the object in front, and lateral safety clearance kept between the vehicle and objects on either side of it. Optionally, in case of a fault, for example, in the safety belt device 220, the control device 130 may also determine the increased safe braking distance and safe following distance. The safe distance control device 270, upon receiving the control instruction, recalculates the safe distances so that such newly generated safe distances are greater than those previously obtained. Further, the safe distance control device 270 may supply information on the safe distances calculated to the active safety devices 140 such as the speed-limiting device 260 and the radar device 250. The speed-limiting device 260, upon receiving the control instruction, may limit the maximum speed of the vehicle. Furthermore, the control device 130 also sends to the notification device 150 a fault information informing of the fault in the safety belt device 220 while the notification device 150 is responsible for notifying the vehicle occupants of the fault in the safety belt device 220, which requires examination and maintenance.

In some implementations, the fault detection device 120, upon detection of any fault in the side impact sensor, instructs that fault information informing of such a fault in the side impact sensor 230 to be transmitted to the control device 130. The control device 130 may then respond to the fault information that is received, and determine that the safe distance control device 270 should increase the safe distance of the vehicle, and issue a control instruction to the safe distance control device 270 requesting such an increase in the safe distance of the vehicle. The safe distance control device 270, in accordance with the control instruction, recalculates the safe distances so that such newly generated safe distances are greater than those previously obtained. Further, the safe distance control device 270 may supply information on the recalculated safe distances to the active safety devices 140 such as the speed-limiting device 260 and the radar device 250. Optionally, the safe distance of the vehicle may be the lateral safe clearance kept between the vehicle and objects to its sides. Furthermore, the control device 130 also sends to the notification device 150 a fault information informing of the fault in the side impact sensor 230, while the notification device 150 is responsible for notifying the vehicle occupants of the fault in the side impact sensor 230, which requires examination and maintenance.

In some implementations, the fault detection device 120, upon detection of any fault in the pedestrian protection device 240, instructs that fault information informing of such a fault in the pedestrian protection device 240 be transmitted to the control device 130. The control device 130 may then respond to the fault information that is received, determine that the radar device 250 should extend its detection or alarm range, and issue a control instruction to the radar device 250 requesting an extension in its detection or alarm range. For example, when there is no fault in the pedestrian protection device 240, the radar device 250 is set to detect pedestrians within a certain designated range. Following a fault in the pedestrian protection device 240, the radar device 250 may, in accordance with the control instruction from the control device, detect pedestrians within a range greater than the one previously designated. Furthermore, the control device 130 also sends to the notification device 150 a fault information informing of the fault in the pedestrian protection device 240, while the notification device 150 is responsible for notifying the vehicle occupants of the fault in the pedestrian protection device 240, which requires examination and maintenance.

In some implementations, the control device 130 may also further respond to fault information received from the fault detection device 120 informing of a fault in the passive safety device 110 by suspending the operation of the passive safety device 110. For example, when there is a fault in the airbag device 210, the control device 130 may suspend the operation of the airbag device 210 by disconnecting it from the power supply and by manipulating its internal mechanisms so as to avoid the airbag device being wrongly triggered.

Furthermore, implementations and examples of the disclosure are not limited to situations where faults are found in the passive safety devices of the vehicle. Fault information may also be submitted when faults are found in other systems, such as the braking system, engine control system, driver assistance system and transmission system to the control device 130. The control device 130 then determines the corresponding active safety protection solutions and issues control instructions to the active safety devices 140 requesting the execution of such solutions. The active safety devices 140 respond to the control instructions and execute the active safety protection solutions.

Furthermore, implementations and examples of the disclosure are not limited to protection afforded by the active safety devices 140 of the vehicle. For example, the fault detection device 120, upon detection of a fault in the passive safety device 110 or any other control system, may send a fault information informing of such a fault in the passive safety device 110 to the control device 130, which can then determine the corresponding auxiliary control solutions and issue control instructions to any back-up passive safety devices, control systems or auxiliary systems requesting the execution of such solutions. The back-up passive safety devices, control systems or auxiliary systems respond to such control instructions, executing the auxiliary control solutions and thereby affording protection.

Figure 3:
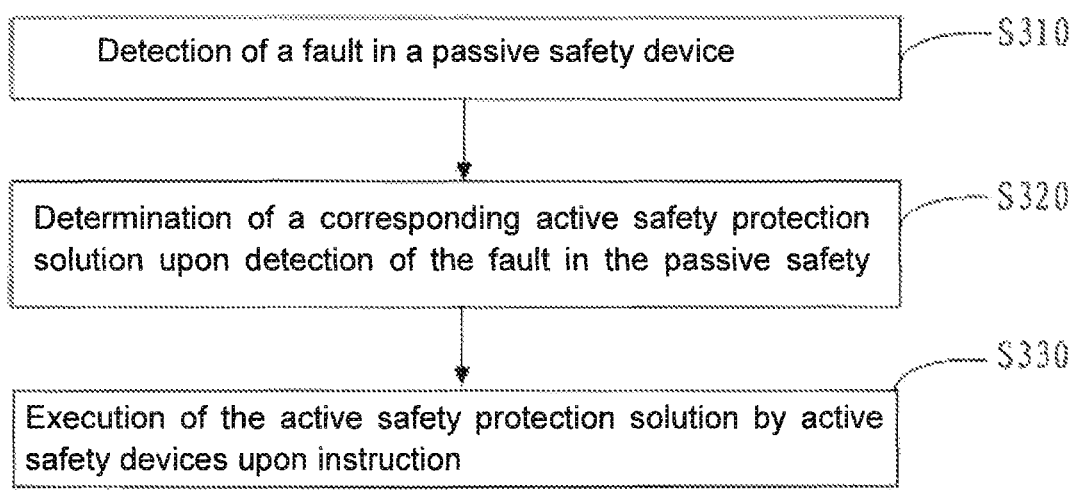
FIG. 3 is an exemplary flow chart of a safety control method for use in vehicles.

FIG. 3 shows a flow chart of the safety control method for use in vehicles. As shown in FIG. 3, in step S310, the fault detection device 120 detects whether a fault occurs in the passive safety device 110. In step S320, the fault detection device 120, upon detecting a fault in the passive safety device 110, instructs that fault information informing of such a fault in the passive safety device 110 to be transmitted to the control device 130. And such control device 130 determines the corresponding active safety protection solutions. In step S330, the control device 130 instructs the active safety devices 140 to execute the active safety protection solutions.

The vehicle safety control system described may be installed on a vehicle and realized in the form of a software. In some implementations, the aims of the disclosure may also be achieved by way of hardware or a combination of software and hardware.

While the above describes in detail certain implementations and examples of the disclosure, the scope of protection is not limited by such descriptions. It should be obvious that a person of ordinary skill in the art will be able to implement various alterations, replacements and transformations to the implementations and examples of the disclosure without departing from the scope of the disclosure.

A number of implementations have been described. Nevertheless, it will be understood that various modifications may be made without departing from the spirit and scope of the disclosure. Accordingly, other implementations are within the scope of the following claims.

What is claimed is:

1. A vehicle safety control system, comprising:
    a passive safety device providing passive safety protection to a vehicle;
    a control device;
    an active safety protection device; and
    a fault detection device detecting any fault in the passive safety device and which upon detection of a fault in the passive safety device, instructs that fault information informing of such fault in the passive safety device be transmitted to the control device,
wherein the control device:
responds to the fault information that is received,
determines a corresponding active safety protection solution, and
issues a control instruction of the active safety protection solution to the active safety protection device,
wherein the active safety protection device responds to the control instruction and executes the active safety protection solution,
wherein the passive safety device comprises at least one of the following devices: an airbag device, a safety belt device, a side impact sensor or a pedestrian protection device, and
wherein the active safety protection device comprises at least one of the following devices: a radar device or a safe distance control device.

2. The vehicle safety control system of claim 1, wherein the safety protection device comprises at least one of the following devices: the radar device, a speed-limiting device, or the safe distance control device, and
wherein the control device is further configured to respond to the fault information received from the fault detection device, and to determine that the active safety protection solution is to lower the maximum speed of the vehicle by means of the speed-limiting device.

3. A vehicle safety control system, comprising:
a passive safety device providing passive safety protection to a vehicle;
a control device;
an active safety protection device; and
a fault detection device detecting any fault in the passive safety device and which upon detection of a fault in the passive safety device, instructs that fault information informing of such fault in the passive safety device be transmitted to the control device,
wherein the control device:
responds to the fault information that is received,
determines a corresponding active safety protection solution, and
issues a control instruction of the active safety protection solution to the active safety protection device,
wherein the active safety protection device responds to the control instruction and executes the active safety protection solution,
wherein the passive safety device comprises at least one of the following devices: an airbag device, a safety belt device, a side impact sensor or a pedestrian protection device,
wherein the active safety protection device comprises at least one of the following devices: a radar device, a speed-limiting device or a safe distance control device, and,
wherein the control device is further configured to respond to the fault information received from the fault detection device, and to determine that the active safety protection solution is to increase the safe distance of the vehicle by means of the safe distance control device.

4. A vehicle safety control system, comprising:
a passive safety device providing passive safety protection to a vehicle;
a control device;
an active safety protection device; and
a fault detection device detecting any fault in die passive safety device and which upon detection of a fault in the passive safety device, instructs that fault information informing of such fault in the passive safety device be transmitted to the control device,
wherein the control device:
responds to the fault information that is received,
determines a corresponding active safety protection solution, and
issues a control instruction of the active safety protection solution to the active safety protection device,
wherein the active safety protection device responds to the control instruction and executes the active safety protection solution,
wherein the passive safety device comprises at least one of the following devices: an airbag device, a safety belt device, a side impact sensor or a pedestrian protection device,
wherein the active safety protection device comprises at least one of the following devices: a radar device, a speed-limiting device or a safe distance control device, and,
wherein the control device is further configured to respond to the fault information received from the fault detection device, and to determine that the active safety protection solution is to the speed-limiting device and increase the safe distance of the vehicle by means of the speed limiting device and the safe distance control device, respectively.

5. A vehicle safety control system, comprising:
a passive safety device providing passive safety protection to a vehicle;
a control device;
an active safety protection device; and
a fault detection device detecting any fault in the passive safety device and which upon detection of a fault in the passive safety device, instructs that fault information informing of such fault in the passive safety device be transmitted to the control device,
wherein the control device:
responds to the fault information that is received,
determines a corresponding active safety protection solution, and
issues a control instruction of the active safety protection solution to the active safety protection device,
wherein the active safety protection device responds to the control instruction and executes the active safety protection solution,
wherein the passive safety device comprises at least one of the following devices: an airbag device, a safety belt device, a side impact sensor or a pedestrian protection device,
wherein the active safety protection device comprises at least one of the following devices: a radar device, a speed-limiting device or a safe distance control device, and,
wherein the control device is further configured to respond to the fault information received from the fault detection device, and to determine that the active safety protection solution is to increase the detection range of the radar device.

6. A safety control method for use in vehicles, comprising:
detecting a fault in a passive safety device;
determining a corresponding active safety protection solution upon detection of a fault in the passive safety device; and
executing the active safety protection solution by way of active safety devices upon instruction, wherein the passive safety device comprises at least one of the following devices: an airbag device, a safety belt device, a side impact sensor or a pedestrian protection device, and wherein the active safety protection device comprises at least one of the following devices: a radar device or a safe distance control device.

7. The safety control method of claim 6, wherein the safety protection device comprises at least one of the following devices: the radar device, a speed-limiting device, or the safe distance control device, and wherein the determined corresponding active safety protection solution includes lowering the maximum speed of the vehicle by way of the speed-limiting device.

8. A safety control method for use in vehicles, comprising:

detecting a fault in a passive safety device;

determining a corresponding active safety protection solution upon detection of a fault in the passive safety device; and executing the active safety protection solution by way of active safety devices upon instruction, wherein the passive safety device comprises at least one of the following devices: an airbag device, a safety belt device, a side impact sensor or a pedestrian protection device, wherein the active safety protection device comprises at least one of the following devices: a radar device, a speed-limiting device or a safe distance control device, and wherein the determined corresponding active safety protection solution includes increasing the safe distance of the vehicle by way of the safe distance control device.

9. A safety control method for use in vehicles, comprising:

detecting a fault in a passive safety device, determining a corresponding active safety protection solution upon detection of a fault in the passive safety device; and executing the active safety protection solution by way of active safety devices upon instruction, wherein the passive safety device comprises at least one of the following devices: an airbag device, a safety belt device, a side impact sensor or a pedestrian protection device, wherein the active safety protection device comprises at least one of the following devices: a radar device, a speed-limiting device or a safe distance control device, and wherein the determined corresponding active safety protection solution includes increasing the safe distance of the vehicle by way of the speed limiting device and the safe distance control device, respectively.

10. A safety control method for use in vehicles, comprising:

detecting a fault in a passive safety device;

determining a corresponding active safety protection solution upon detection of a fault in the passive safety device; and executing the active safety protection solution by way of active safety devices upon instruction, wherein the passive safety device comprises at least one of the following devices: an airbag device, a safety belt device, a side impact sensor or a pedestrian protection device, wherein the active safety protection device comprises at least one of the following devices: a radar device, a speed-limiting device or a safe distance control device, and wherein the determined corresponding active safety protection solution includes increasing the detection range of the radar device.

\* \* \* \* \*